(12) United States Patent
Khlat

(10) Patent No.: US 9,270,302 B2
(45) Date of Patent: Feb. 23, 2016

(54) CARRIER AGGREGATION ARRANGEMENT USING TRIPLE ANTENNA ARRANGEMENT

(71) Applicant: RF Micro Devices, Inc., Greensboro, NC (US)

(72) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 55 days.

(21) Appl. No.: 14/302,500

(22) Filed: Jun. 12, 2014

(65) Prior Publication Data

US 2014/0376417 A1    Dec. 25, 2014

Related U.S. Application Data

(60) Provisional application No. 61/837,460, filed on Jun. 20, 2013.

(51) Int. Cl.
| | | |
|---|---|---|
| *H04L 5/14* | (2006.01) | |
| *H04L 5/00* | (2006.01) | |
| *H04W 4/00* | (2009.01) | |
| *H04L 12/66* | (2006.01) | |
| *H04B 1/00* | (2006.01) | |

(52) U.S. Cl.
CPC .............. *H04B 1/0064* (2013.01); *H04L 5/001* (2013.01)

(58) Field of Classification Search
CPC ...... H04B 1/005; H04B 1/006; H04B 1/0057; H04B 1/0064; H04B 1/0067; H04B 1/16; H04B 1/18; H04B 1/38; H04B 1/40; H04B 1/44; H04B 1/401; H04B 7/0413; H04B 7/0404; H04B 7/0691; H04B 2001/1072; H04W 88/06; H03H 7/46; H03H 7/463; H03H 9/0566; H03H 9/725; H03H 11/344; H03J 5/242

USPC ................ 370/229–240, 272–309, 310–350, 370/400–401, 431–463
See application file for complete search history.

(56) References Cited

U.S. PATENT DOCUMENTS

| | | | |
|---|---|---|---|
| 7,376,440 B2 | 5/2008 | Forrester et al. | |
| 7,546,091 B2 | 6/2009 | Murakami et al. | |
| 8,552,816 B2 * | 10/2013 | Khlat | H04B 1/406 333/129 |
| 8,849,217 B2 * | 9/2014 | Rousu | H01Q 3/2605 370/328 |
| 8,892,057 B2 * | 11/2014 | Khlat | H04L 5/00 370/277 |
| 8,903,409 B2 * | 12/2014 | Winiecki | H04L 5/001 375/267 |
| 9,118,376 B2 * | 8/2015 | Khlat | H04B 1/10 |
| 2002/0130734 A1 | 9/2002 | Liang et al. | |

(Continued)

OTHER PUBLICATIONS

Non-Final Office Action for U.S. Appl. No. 14/498,991, mailed Aug. 17, 2015, 13 pages.

(Continued)

*Primary Examiner* — Tri H Phan
(74) *Attorney, Agent, or Firm* — Withrow & Terranova, P.L.L.C.

(57) ABSTRACT

Front end circuitry includes at least three antenna nodes, a first duplexer, a second duplexer, a first diplexer, transceiver circuitry, and front end switching circuitry. The transceiver circuitry is coupled to the first duplexer, the second duplexer, and the first diplexer. The front end switching circuitry is coupled between the antenna nodes, the first duplexer, the second duplexer, and the first diplexer and configured to selectively couple the first duplexer to a first one of the antenna nodes, selectively couple the second duplexer to a second one of the antenna nodes, and selectively couple the first diplexer to a third one of the antenna nodes.

24 Claims, 5 Drawing Sheets

(56) References Cited

U.S. PATENT DOCUMENTS

| | | | |
|---|---|---|---|
| 2006/0194550 A1* | 8/2006 | Block | H04B 1/005 455/78 |
| 2013/0077540 A1 | 3/2013 | Black et al. | |
| 2014/0003300 A1* | 1/2014 | Weissman | H04B 1/0064 370/273 |
| 2014/0192845 A1* | 7/2014 | Szini | H04B 7/0413 375/219 |
| 2014/0328220 A1* | 11/2014 | Khlat | H04L 5/1461 370/278 |
| 2015/0085708 A1* | 3/2015 | Khlat | H04B 1/401 370/277 |

OTHER PUBLICATIONS

Notice of Allowance for U.S. Appl. No. 14/282,393, mailed Aug. 19, 2015, 8 pages.

* cited by examiner

| OPERATING BAND | UPLINK (UL) OPERATING BAND | DOWNLINK (DL) OPERATING BAND | DUPLEX MODE |
|---|---|---|---|
| 1 | 1920-1980 | 2110-2170 | FDD |
| 2 | 1850-1910 | 1920-1990 | FDD |
| 3 | 1710-1785 | 1805-1880 | FDD |
| 4 | 1710-1755 | 2110-2155 | FDD |
| 5 | 824-849 | 869-894 | FDD |
| 6 | 830-840 | 865-875 | FDD |
| 7 | 2500-2570 | 2620-2690 | FDD |
| 8 | 880-915 | 925-960 | FDD |
| 9 | 1749.9-1784.9 | 1844.9-1879.9 | FDD |
| 10 | 1710-1770 | 2110-2170 | FDD |
| 11 | 1427.9-1447.9 | 1475.9-1495.9 | FDD |
| 12 | 698-716 | 728-746 | FDD |
| 13 | 777-787 | 746-756 | FDD |
| 14 | 788-798 | 758-768 | FDD |
| 15 | RESERVED | RESERVED | - |
| 16 | RESERVED | RESERVED | - |
| 17 | 704-716 | 734-746 | FDD |
| 18 | 815-830 | 860-875 | FDD |
| 19 | 830-845 | 875-890 | FDD |
| 20 | 832-862 | 791-821 | FDD |
| 21 | 1447.9-1462.9 | 1495.9-1510.9 | FDD |
| 22 | 3410-3500 | 3510-3600 | FDD |
| ... | ... | ... | ... |
| 33 | 1900-1920 | 1900-1920 | TDD |
| 34 | 2010-2025 | 2010-2025 | TDD |
| 35 | 1850-1910 | 1850-1910 | TDD |
| 36 | 1930-1990 | 1930-1990 | TDD |
| 37 | 1910-1930 | 1910-1930 | TDD |
| 38 | 2570-2620 | 2570-2620 | TDD |
| 39 | 1880-1920 | 1880-1920 | TDD |
| 40 | 2300-2400 | 2300-2400 | TDD |
| 41 | 3400-3600 | 3400-3600 | TDD |

*FIG. 1*
*(RELATED ART)*

CARRIER AGGREGATION ARRANGEMENT USING TRIPLE ANTENNA ARRANGEMENT

RELATED APPLICATIONS

This application claims the benefit of U.S. provisional patent application Ser. No. 61/837,460, filed Jun. 20, 2013, the disclosure of which is incorporated herein by reference in its entirety.

FIELD OF THE DISCLOSURE

The present disclosure relates to front end circuitry for a wireless communication system capable of operating in one or more carrier aggregation configurations.

BACKGROUND

Modern mobile telecommunications standards continue to demand increasingly greater rates of data exchange (data rates). One way to increase the data rate of a mobile device is through the use of carrier aggregation. Carrier aggregation allows a single mobile device to aggregate bandwidth across one or more operating bands in the wireless spectrum. The increased bandwidth achieved as a result of carrier aggregation allows a mobile device to obtain higher data rates than have previously been available.

FIG. 1 shows a table describing a number of wireless communication operating bands in the wireless spectrum. One or more of the operating bands may be used, for example, in a Code Division Multiple Access (CDMA), Global System for Mobile Communications (GSM), Long Term Evolution (LTE), or LTE-advanced equipped mobile device. The first column indicates the operating band number for each one of the operating bands. The second and third columns indicate the uplink and downlink frequency bands for each one of the operating bands, respectively. Finally, the fourth column indicates the duplex mode of each one of the operating bands. In non-carrier aggregation configurations, a mobile device will generally communicate using a single portion of the uplink or downlink frequency bands within a single operating band. In carrier aggregation applications, however, a mobile device may aggregate bandwidth across a single operating band or multiple operating bands in order to increase the data rate of the device.

FIG. 2A shows a diagram representing a conventional, non-carrier aggregation configuration for a mobile device. In this conventional configuration, a mobile device communicates using a single portion of a wireless spectrum 10 within a single operating band 12. Under the conventional approach, the data rate of the mobile device is constrained by the limited available bandwidth.

FIGS. 2B-2D show diagrams representing a variety of carrier aggregation configurations for a mobile device. FIG. 2B shows an example of contiguous intra-band carrier aggregation, in which the aggregated portions of the wireless spectrum 14A and 14B are located directly adjacent to one another and are in the same operating band 16. FIG. 2C shows an example of non-contiguous intra-band carrier aggregation, in which the aggregated portions of the wireless spectrum 18A and 18B are located within the same operating band 20, but are not directly adjacent to one another. Finally, FIG. 2D shows an example of inter-band carrier aggregation, in which the aggregated portions of the wireless spectrum 22A and 22B are located in different operating bands 24 and 26. A modern mobile device should be capable of supporting each one of the previously described carrier aggregation configurations.

FIG. 3 shows conventional front end circuitry 30 for a wireless communications system capable of operating in one or more carrier aggregation configurations. The conventional front end circuitry 30 includes a first antenna 32A, a second antenna 32B, a first diplexer 34A, a second diplexer 34B, front end switching circuitry 36, filtering circuitry 38, and transceiver circuitry 40. The transceiver circuitry 40 includes a first transceiver module 42A, a second transceiver module 42B, a first receiver module 44A, and a second receiver module 44B. As will be appreciated by those of ordinary skill in the art, the first transceiver module 42A and the first receiver module 44A may each be associated with a first operating band (hereinafter referred to as band A), such that the first transceiver module 42A is configured to support the transmission and reception of signals about band A, and the first receiver module 44A is configured to support the reception of signals about band A. Similarly, the second transceiver module 42B and the second receiver module 44B may each be associated with a second operating band (hereinafter referred to as band B), such that the second transceiver module 42B is configured to support the transmission and reception of signals about band B, and the second receiver module 44B is configured to support the reception of signals about band B.

The first transceiver module 42A includes a first power amplifier 46 and a first low noise amplifier (LNA) 48. The first transceiver module 42A is configured to receive band A baseband transmit signals at a band A transmit node TX_A, amplify the band A baseband transmit signals to a level appropriate for transmission from the first antenna 32A or the second antenna 32B using the first power amplifier 46, and deliver the amplified band A transmit signals to the front end switching circuitry 36 through the filtering circuitry 38. The first transceiver module 42A is further configured to receive band A receive signals at the first LNA 48 through the filtering circuitry 38, amplify the band A receive signals using the first LNA 48, and deliver the amplified band A receive signals to a band A receive node RX_A for further processing, for example, by baseband circuitry (not shown).

Similar to the first transceiver module 42A, the second transceiver module 42B includes a second power amplifier 50 and a second LNA 52. The second transceiver module 42B is configured to receive band B baseband transmit signals at a band B transmit node TX_B, amplify the band B baseband transmit signals to a level appropriate for transmission from one of the first antenna 32A and the second antenna 32B using the second power amplifier 50, and deliver the amplified band B transmit signals to the front end switching circuitry 36 through the filtering circuitry 38. The second transceiver module 42B is further configured to receive band B receive signals at the second LNA 52 through the filtering circuitry 38, amplify the band B receive signals using the second LNA 52, and deliver the amplified band B receive signals to a band B receive node RX_B for further processing, for example, by baseband circuitry (not shown).

As discussed above, the conventional front end circuitry 30 is configured to operate in one or more carrier aggregation modes of operation. Accordingly, the first receiver module 44A, the second receiver module 44B, and the filtering circuitry 38 are provided. The first receiver module 44A includes a first receiver LNA 54. The first receiver module 44A is configured to receive band A receive signals from the front end switching circuitry 36 at the first receiver LNA 54 through the filtering circuitry 38, amplify the band A receive signals using the first receiver LNA 54, and deliver the amplified band A receive signals to a second band A receive node RX_A1 for further processing, for example, by baseband circuitry (not shown). Similarly, the second receiver module 44B includes a second receiver LNA 56. The second receiver module 44B is configured to receive band B receive signals from the front end switching circuitry 36 at the second receiver LNA 56 through the filtering circuitry 38, amplify the band B receive signals using the second receiver LNA 56, and deliver the amplified band B receive signals to a second band B receive node RX_B1 for further processing, for example, by baseband circuitry (not shown).

The filtering circuitry 38 includes a quadplexer 58 and a duplexer 60. The quadplexer 58 passes band A transmit signals between the first power amplifier 46 and the front end switching circuitry 36, passes band A receive signals between the front end switching circuitry 36 and the first LNA 48, passes band B transmit signals between the second power amplifier 50 and the front end switching circuitry 36, and passes band B receive signals between the front end switching circuitry 36 and the second LNA 52, while attenuating signals outside of the respective bands for each signal path. Similarly, the duplexer 60 passes band A receive signals between the front end switching circuitry 36 and the first receiver LNA 54 and passes band B receive signals between the front end switching circuitry 36 and the second receiver LNA 56, while attenuating signals outside of the respective bands for each signal path.

The front end switching circuitry 36 includes band selection circuitry 62, antenna swapping circuitry 64, and switching control circuitry 66. The band selection circuitry 62 includes low-band selection circuitry 68 and mid/high-band selection circuitry 70 for each one of the first antenna 32A and the second antenna 32B. Specifically, the band selection circuitry 62 includes first low-band band selection circuitry 68A coupled to the first antenna 32A through the first diplexer 34A, first mid/high-band selection circuitry 70A coupled to the first antenna 32A through the first diplexer 34A, second low-band selection circuitry 68B coupled to the second antenna 32B through the second diplexer 34B, and second mid/high-band selection circuitry 70B coupled to the second antenna 32B through the second diplexer 34B. Each one of the diplexers 34 are configured to pass low-band signals between the connected low-band selection circuitry 68 and the connected one of the antennas 32, pass mid/high-band signals between the connected mid/high-band selection circuitry 70 and the connected one of the antennas 32, and attenuate signals outside of the respective low and mid/high bands while providing isolation between the connected low-band selection circuitry 68 and the connected mid/high-band selection circuitry 70. The band selection circuitry 62 is configured to place one or more modules in the transceiver circuitry 40 in contact with the first antenna 32A or the second antenna 32B in order to transmit and receive signals about the operating bands associated with the one or more transceiver modules.

The antenna swapping circuitry 64 is coupled between the transceiver circuitry 40 and the band selection circuitry 62, and is configured to swap the antenna presented to the quadplexer 58 and the duplexer 60. As will be appreciated by those of ordinary skill in the art, the antenna swapping circuitry 64 may swap antennas between the quadplexer 58 and the duplexer 60 in order ensure that signals are transmitted from either the first transceiver module 42A or the second transceiver module 42B using the one of the antennas 32 with the most favorable transmission characteristics at the time.

The switching control circuitry 66 operates the band selection circuitry 62 and the antenna swapping circuitry 64. In a first operating mode of the front end switching circuitry 36, the switching control circuitry 66 operates the band selection circuitry 62 and the antenna swapping circuitry 64 to place the first transceiver module 42A and the second transceiver module 42B in contact with the first antenna 32A through the quadplexer 58, and place the first receiver module 44A and the second receiver module 44B in contact with the second antenna 32B through the duplexer 60. In this configuration, the conventional front end circuitry 30 may simultaneously transmit band A signals while receiving band A signals and band B signals from the first antenna 32A, and simultaneously receive band A signals and band B signals from the second antenna 32B. Alternatively in this configuration, the conventional front end circuitry 30 may simultaneously transmit band B signals while receiving band A and band B signals from the first antenna 32A, and simultaneously receive band A signals and band B signals from the second antenna 32B.

In a second operating mode of the front end switching circuitry 36, the switching control circuitry 66 operates the band selection circuitry 62 and the antenna swapping circuitry 64 to place the first transceiver module 42A and the second transceiver module 42B in contact with the second antenna 32B through the quadplexer 58, and place the first receiver module 44A and the second receiver module 44B in contact with the first antenna 32A through the duplexer 60. In this configuration, the conventional front end circuitry 30 may simultaneously transmit band A signals while receiving band A signals and band B signals from the second antenna 32B, and simultaneously receive band A signals and band B signals from the first antenna 32A. Alternatively in this configuration, the conventional front end circuitry 30 may simultaneously transmit band B signals while receiving band A signals and band B signals from the second antenna 32B, while receiving band A signals and band B signals from the first antenna 32A.

Although capable of operating in one or more carrier aggregation configurations, the conventional front end circuitry 30 generally suffers from poor efficiency. As discussed above, both the first transceiver module 42A and the second transceiver module 42B are connected to either the first antenna 32A or the second antenna 32B, depending on which antenna is used for the transmission of signals, at any given time. Accordingly, at least one of the first antenna 32A or the second antenna 32B is always loaded by at least the quadplexer 58. The relatively large load associated with the quadplexer 58 results in excessive insertion loss in the conventional front end circuitry 30, thereby degrading the efficiency of a mobile terminal in which the conventional front end circuitry 30 is incorporated. Accordingly, there is a need for front end circuitry that is capable of operating in a variety of carrier aggregation configurations while also maintaining the efficiency and performance of the front end circuitry.

SUMMARY

The present disclosure relates to front end circuitry for a wireless communication system capable of operating in one or more carrier aggregation configurations. According to one embodiment, front end circuitry includes at least three antenna nodes, a first duplexer, a second duplexer, a first diplexer, transceiver circuitry, and front end switching circuitry. The transceiver circuitry is coupled to the first duplexer, the second duplexer, and the first diplexer. The front end switching circuitry is coupled between the antenna nodes, the first duplexer, the second duplexer, and the first diplexer and configured to selectively couple the first duplexer to a first one of the antenna nodes, selectively couple the second duplexer to a second one of the antenna nodes, and selectively couple the first diplexer to a third one of the antenna nodes. By including at least three antenna nodes and selectively coupling the first duplexer, the second duplexer, and the first diplexer to different ones of the antenna nodes, the front end circuitry may be suitable for performing carrier aggregation for any combination of bands while simultaneously reducing insertion loss in the front end circuitry when compared to conventional front end solutions.

According to one embodiment, the first duplexer is configured to isolate signals about a first operating band, delivering transmit signals about the first operating band from the transceiver circuitry to the front end switching circuitry and delivering receive signals about the first operating band from the front end switching circuitry to the transceiver circuitry, while attenuating other signals. Further, the second duplexer is configured to isolate signals about a second operating band, delivering transmit signals about the second operating band from the transceiver circuitry to the front end switching circuitry and delivering receive signals about the second operating band from the front end switching circuitry to the transceiver circuitry, while attenuating other signals.

According to one embodiment, the first diplexer is configured to separate receive signals about the first operating band from receive signals about the second operating band, separately delivering the receive signals from the front end switching circuitry to the transceiver circuitry, while attenuating other signals.

According to one embodiment, a mobile terminal includes baseband circuitry, at least three antennas, and front end circuitry coupled between the baseband circuitry and the antennas. The front end circuitry includes a first duplexer, a second duplexer, a first diplexer, transceiver circuitry, and front end switching circuitry. The transceiver circuitry is coupled between the baseband circuitry, the first duplexer, the second duplexer, and the first diplexer. The front end switching circuitry is coupled between the antennas, the first duplexer, the second duplexer, and the first diplexer, and is configured to selectively couple the first duplexer to a first one of the antennas, selectively couple the second duplexer to a second one of the antennas, and selectively couple the first diplexer to a third one of the antennas. By including at least three antennas and selectively coupling the first duplexer, the second duplexer, and the first diplexer to different antenna nodes, the front end circuitry may be suitable for performing carrier aggregation for any combination of bands while simultaneously reducing insertion loss in the front end circuitry when compared to conventional front end solutions.

According to one embodiment, the first duplexer is configured to isolate signals about a first operating band, delivering transmit signals about the first operating band from the transceiver circuitry to the front end switching circuitry and delivering receive signals about the first operating band from the front end switching circuitry to the transceiver circuitry, while attenuating other signals. Further, the second duplexer is configured to isolate signals about a second operating band, delivering transmit signals about the second operating band from the transceiver circuitry to the front end switching circuitry and delivering receive signals about the second operating band from the front end switching circuitry to the transceiver circuitry, while attenuating other signals.

According to one embodiment, the first diplexer is configured to separate receive signals about the first operating band from receive signals about the second operating band, separately delivering the receive signals from the front end switching circuitry to the transceiver circuitry, while attenuating other signals.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 shows a table describing a number of wireless communication operating bands in the wireless spectrum.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2A:
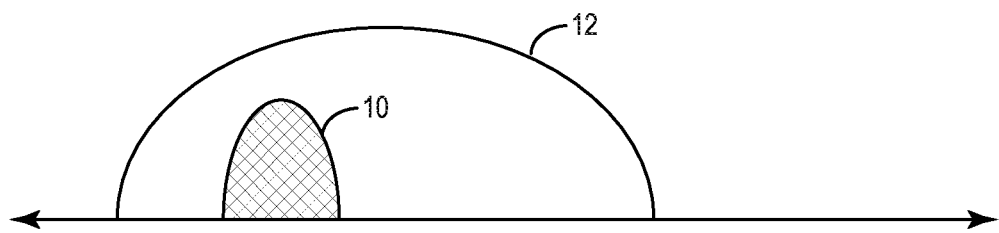
FIGS. 2A-2D show diagrams illustrating a number of carrier aggregation configurations for a mobile device.
Figure 2B:
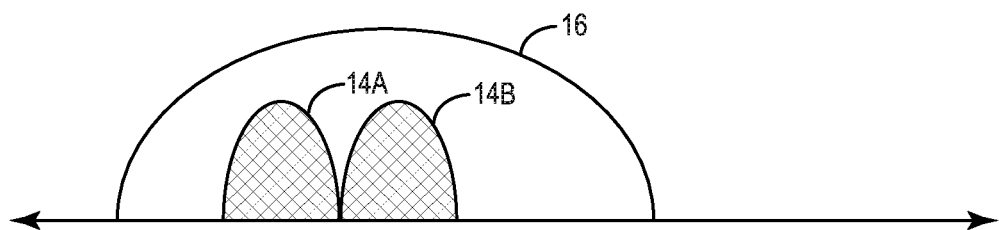
Figure 2C:
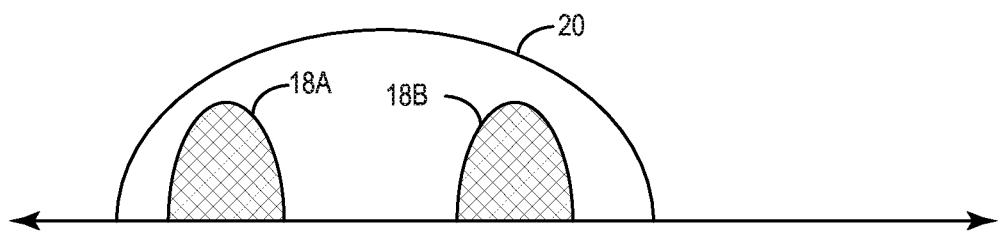
Figure 2D:
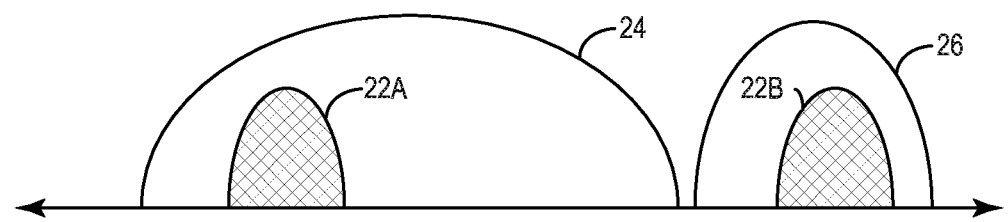
Figure 3:
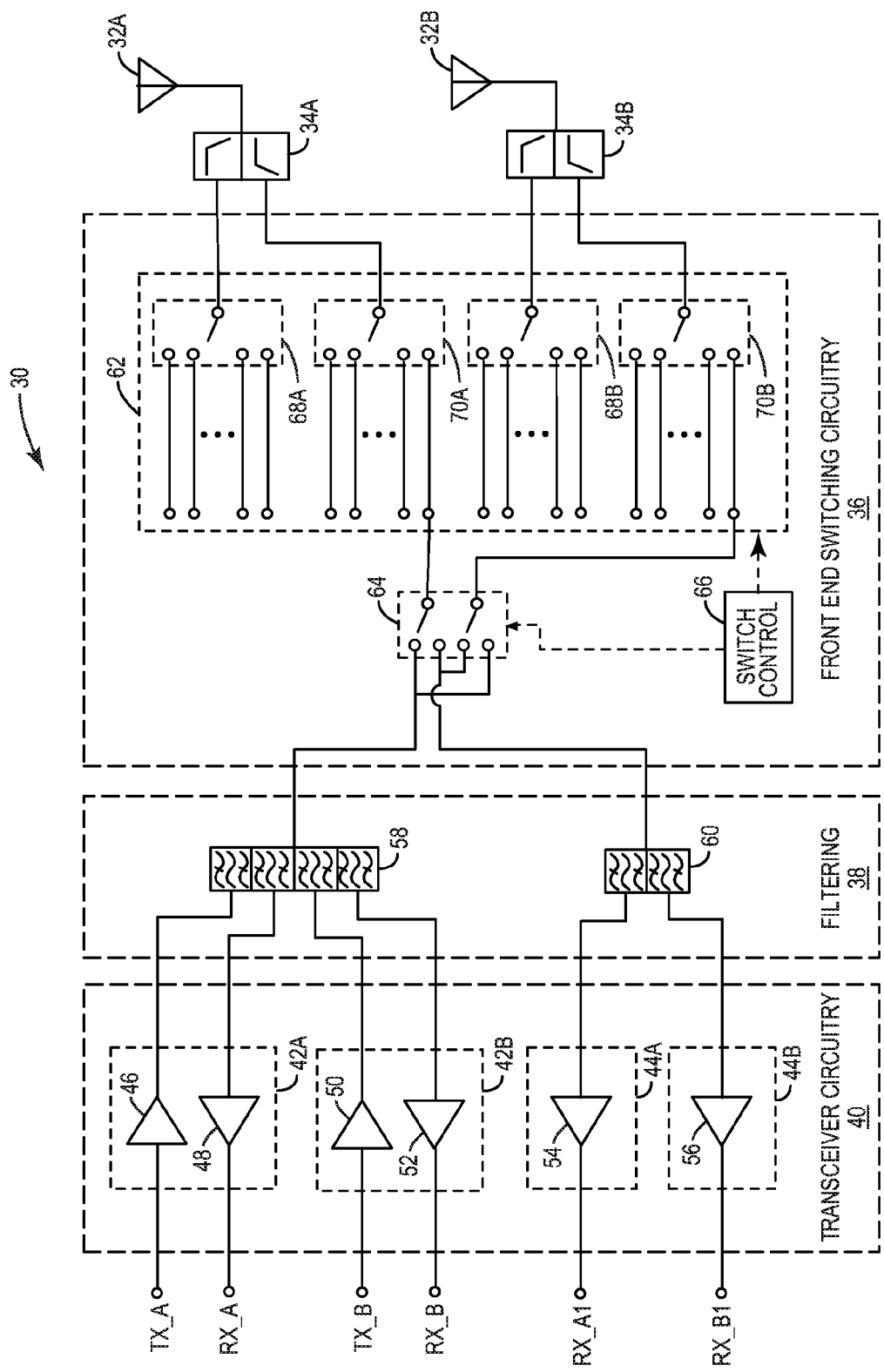
FIG. 3 shows a schematic representation of conventional front end circuitry capable of operating in one or more carrier aggregation configurations.
Figure 4:
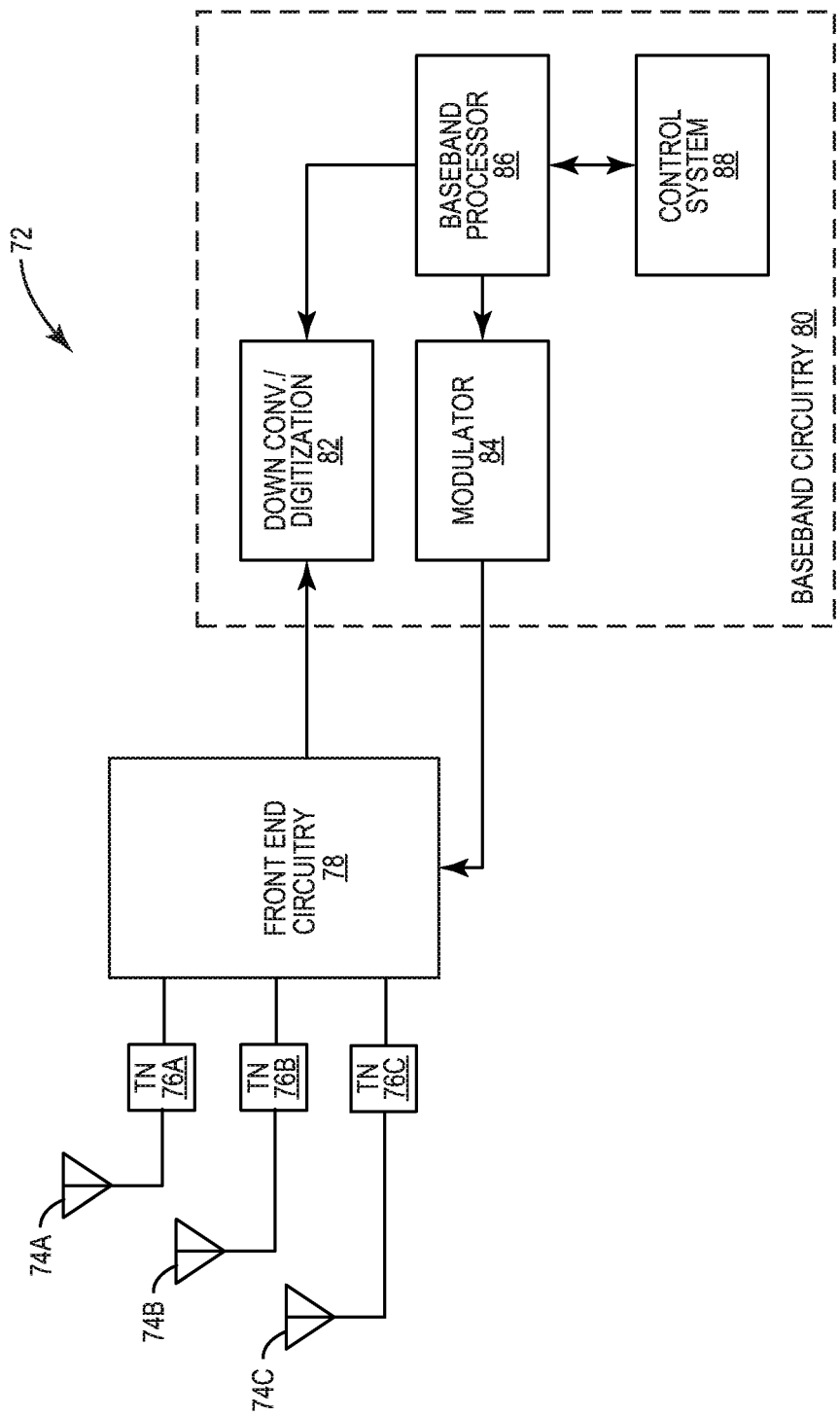
FIG. 4 shows a block diagram of a mobile terminal capable of operating in one or more carrier aggregation configurations according to one embodiment of the present disclosure.

Turning now to FIG. 4, a mobile terminal 72 suitable for a variety of carrier aggregation configurations is shown according to one embodiment of the present disclosure. The mobile terminal 72 includes three antennas 74, antenna tuning circuitry 76, front end circuitry 78, and baseband circuitry 80. Specifically, the mobile terminal 72 includes a first antenna 74A coupled to the front end circuitry 78 through first antenna tuning circuitry 76A, a second antenna 74B coupled to the front end circuitry 78 through second antenna tuning circuitry 76B, and a third antenna 74C coupled to the front end circuitry 78 through third antenna tuning circuitry 76C. The baseband circuitry includes down-conversion/digitization circuitry 82, a modulator 84, a baseband processor 86, and a control system 88. In operation, one or more radio frequency (RF) signals are received at the antennas 74 and passed through the antenna tuning circuitry 76 to the front end circuitry 78. The front end circuitry 78 then filters and amplifies the received signals, selectively delivering all or a portion thereof to the baseband circuitry 80. In the baseband circuitry 80, down-conversion/digitization circuitry 82 down-converts the filtered and amplified receive signals to generate an intermediate or baseband signal, which is then digitized into one or more digital streams and delivered to the baseband processor 86. The baseband processor 86 processes the digital streams to extract the information or data bits conveyed in the signal. The processing may include demodulation, decoding, or error correction operations. As such, the baseband processor 86 may be implemented in one or more digital signal processors (DSPs).

On the transmit side, the baseband processor 86 receives digitized data, which may represent voice, data, or control information, from the control system 88, which it encodes for transmission. The encoded data is output to the modulator 84, where it is modulated at a desired transmit frequency and sent to the front end circuitry 78. An RF power amplifier in the front end circuitry 78 amplifies the modulated carrier signal to a level appropriate for transmission and delivers the amplified and modulated carrier signal to one or more of the antennas 74 through the antenna tuning circuitry 76.

Figure 5:
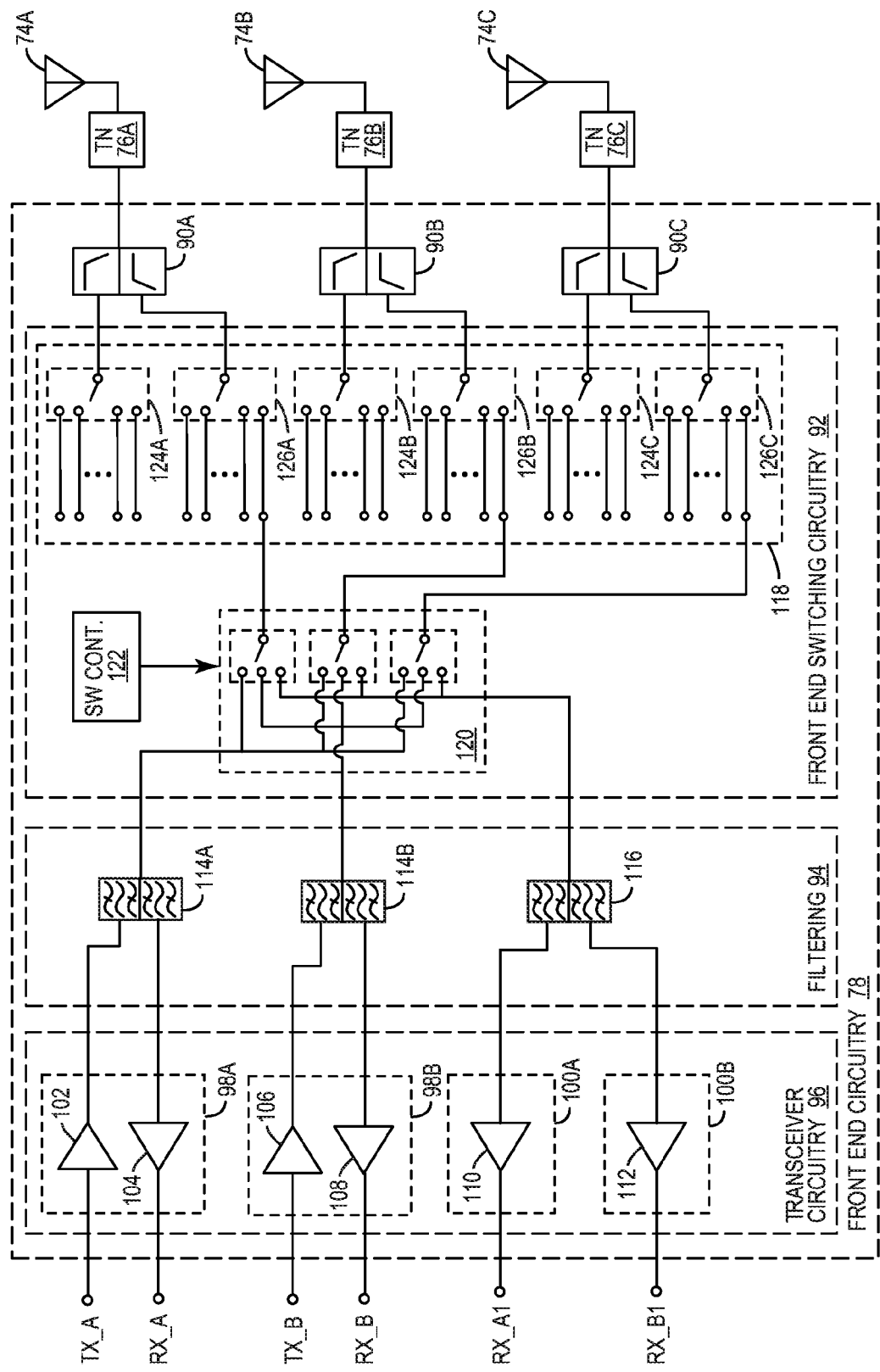
FIG. 5 shows a schematic illustrating the details of the front end circuitry shown in FIG. 5 according to one embodiment of the present disclosure.

FIG. 5 shows details of the front end circuitry 78 shown in FIG. 4 according to one embodiment of the present disclosure. The first antenna 74A, the second antenna 74B, the third antenna 74C, and the antenna tuning circuitry 76 are shown for context. The front end circuitry 78 includes a first diplexer 90A, a second diplexer 90B, a third diplexer 90C, front end switching circuitry 92, filtering circuitry 94, and transceiver circuitry 96. The transceiver circuitry 96 includes a first transceiver module 98A, a second transceiver module 98B, a first receiver module 100A, and a second receiver module 100B. As will be appreciated by those of ordinary skill in the art, the first transceiver module 98A and the first receiver module 100A may each be associated with a first operating band (hereinafter referred to as band A), such that the first transceiver module 98A is configured to support the transmission and reception of signals about band A, and the first receiver module 100A is configured to support the reception of signals about band A. Similarly, the second transceiver module 98B and the second receiver module 100B may each be associated with a second operating band (hereinafter referred to as band B), such that the second transceiver module 98B is configured to support the transmission and reception of signals about band B, and the second receiver module 100B is configured to support the reception of signals about band B.

Specifically, the first transceiver module 98A may include a first power amplifier 102 and a first low noise amplifier (LNA) 104. The first transceiver module 98A may be configured to receive band A modulated baseband transmit signals at a band A transmit node TX_A, amplify the band A baseband transmit signals to a level appropriate for transmission from the first antenna 74A, the second antenna 74B, or the third antenna 74C using the first power amplifier 102, and deliver the amplified band A transmit signals to the front end switching circuitry 92 through the filtering circuitry 94. The front end switching circuitry 92 can then deliver the amplified band B transmit signals to the appropriate antenna 74 for transmission. Further, the first transceiver module 98A may be configured to receive band A receive signals at the first LNA 104 through the filtering circuitry 94, amplify the band A receive signals to an appropriate level using the first LNA 104, and deliver the amplified band A receive signals to a band A receive node RX_A for further processing, for example, by the baseband circuitry 80.

Similar to the first transceiver module 98A, the second transceiver module 98B includes a second power amplifier 106 and a second LNA 108. The second transceiver module 98B may be configured to receive band B modulated baseband transmit signals at a band B transmit node TX_B, amplify the band B modulated baseband transmit signals to a level appropriate for transmission from one of the first antenna 74A, the second antenna 74B, or the third antenna 74C using the second power amplifier 106, and deliver the amplified band B transmit signals to the front end switching circuitry 92 through the filtering circuitry 94. The front end switching circuitry 92 can then deliver the amplified band B transmit signals to the appropriate antenna 74 for transmission. Further, the second transceiver module 98B may be configured to receive band B receive signals at the second LNA 108 through the filtering circuitry 94, amplify the band B receive signals to an appropriate level using the second LNA 108, and deliver the amplified band B receive signals to a band B receive node RX_B for further processing, for example, by the baseband circuitry 80.

The front end circuitry 78 may be configured to operate in one or more carrier aggregation configurations. Accordingly, the first receiver module 100A, the second receiver module 100B, and the filtering circuitry 94 are provided. The first receiver module 100A may include a first receiver LNA 110. The first receiver module 100A may be configured to receive band A signals from the front end switching circuitry 92 at the first receiver LNA 110 through the filtering circuitry 94, amplify the band A receive signals to an appropriate level using the first receiver LNA 110, and deliver the amplified band A receive signals to a second band A receive node RX_A1 for further processing, for example, by the baseband circuitry 80. Similarly, the second receiver module 100B may include a second receiver LNA 112. The second receiver module 100B may be configured to receive band B receive signals from the front end switching circuitry 92 at the second receiver LNA 112 through the filtering circuitry 94, amplify the band B receive signals to an appropriate level using the second receiver LNA 112, and deliver the amplified band B receive signals to a second band B receive node RX_B1 for further processing, for example, by the baseband circuitry 80.

The filtering circuitry 94 may include a first duplexer 114A, a second duplexer 114B, and a first diplexer 116. The first duplexer 114A separates band A transmit signals from band A receive signals, routing band A transmit signals from the first power amplifier 102 to the front end switching circuitry 92 and routing band A receive signals from the front end switching circuitry 92 to the first LNA 104, while providing isolation between the first power amplifier 102 and the first LNA 104 and attenuating signals that fall outside of band A. The second duplexer 114B separates band B transmit signals from band B receive signals, routing band B transmit signals from the second power amplifier 106 to the front end switching circuitry 92 and routing band B receive signals from the front end switching circuitry 92 to the second LNA 108, while providing isolation between the second power amplifier 106 and the second LNA 108 and attenuating signals that fall outside of band B. The first diplexer 116 separates band A receive signals from band B receive signals, delivering band A receive signals to the first receiver LNA 110 and delivering band B receive signals to the second receiver LNA 112, while providing isolation between the first receiver LNA 110 and the second receiver LNA 112 and attenuating signals outside of band A and band B for the respective paths.

The front end switching circuitry 92 may include band selection circuitry 118, antenna swapping circuitry 120, and switching control circuitry 122. The band selection circuitry 118 may include low-band selection circuitry 124 and mid/high-band selection circuitry 126 for each one of the first antenna 74A, the second antenna 74B, and the third antenna 74C. Specifically, the band selection circuitry 118 may include first low-band selection circuitry 124A coupled to the first antenna 74A through the first diplexer 90A, second low-band selection circuitry 124B coupled to the second antenna 74B through the second diplexer 90B, and third low-band selection circuitry 124C coupled to the third antenna 74C through the third diplexer 90C. Further, the band selection circuitry 118 may include first mid/high-band selection circuitry 126A coupled to the first antenna 74A through the first diplexer 90A, second mid/high-band selection circuitry 126B coupled to the second antenna 74B through the second diplexer 90B, and third mid/high-band selection circuitry 126C coupled to the third antenna 74C through the third diplexer 90C. The low-band selection circuitry 124 and the mid/high-band selection circuitry 126 may each be single-pole N-throw (SPNT) switches. Each one of the diplexers 90 may be configured to pass low-band signals between the connected antenna 74 and the connected low-band selection circuitry 124, and pass mid/high-band signals between the connected antenna 74 and the connected mid/high-band selection circuitry 126 while providing isolation between the connected low-band selection circuitry 124 and the connected mid/high-band selection circuitry 126 and attenuating signals outside of the respective low and high bands. The band selection circuitry 118 may be configured to appropriately route signals between one or more modules in the transceiver circuitry 96 and the antennas 74 in order to transmit and receive signals about one or more selected operating bands.

The antenna swapping circuitry 120 may be coupled between the filtering circuitry 94 and the band selection circuitry 118, and may be configured to swap the antenna 74 presented to the first duplexer 114A, the second duplexer 114B, and the first diplexer 116. The antenna swapping circuitry 120 may comprise three separate single-pole three-throw (SP3T) switches which can be operated independently by the switching control circuitry 122 to place one of the first duplexer 114A, the second duplexer 114B, or the first diplexer 116 in contact with the antenna 74 to which they are attached. As will be appreciated by those of ordinary skill in the art, the antenna swapping circuitry 120 may swap antennas between the first duplexer 114A, the second duplexer 114B, and the first diplexer 116 in order to ensure that signals are transmitted from either the first transceiver module 98A or the second transceiver module 98B using the one of the antennas 74 with the most favorable transmission characteristics at the time.

The switching control circuitry 122 may operate the band selection circuitry 118 and the antenna swapping circuitry 120. In a carrier aggregation mode of the front end circuitry 78, the switching control circuitry 122 may operate the band selection circuitry 118 and the antenna swapping circuitry 120 to place the first transceiver module 98A in contact with the third antenna 74C through the first duplexer 114A, place the second transceiver module 98B in contact with the second antenna 74B through the second duplexer 114B, and place the first receiver module 100A and the second receiver module 100B in contact with the first antenna 74A through the first diplexer 116. In this configuration, the front end circuitry 78 may simultaneously transmit and receive band A signals from the third antenna 74C, receive band B signals from the second antenna 74B, and receive band A signals and band B signals from the first antenna 74A. Alternatively in this configuration, the front end circuitry 78 may simultaneously transmit and receive band B signals from the second antenna 74B, receive band A signals and band B signals from the first antenna 74A, and receive band A signals from the third antenna 74C. Accordingly, the front end circuitry 78 may utilize carrier aggregation to aggregate bandwidth across band A and band B in order to improve the data rate of a mobile device in which the front end circuitry 78 is integrated.

The baseband circuitry 80 (FIG. 4) may use the band A receive signal at the band A receive node RX_A as a main band A receive signal, and use the band A receive signal at the second band A receive node RX_A1 as a secondary band A receive signal, such as for multiple-input-multiple-output (MIMO) and/or diversity applications. Similarly, the baseband circuitry 80 may use the band B receive signal at the band B receive node RX_B as a main band B receive signal, and use the band B receive signal at the second band B receive node RX_B1 as a secondary band B receive signal, such as for MIMO and/or diversity applications. Alternatively, the baseband circuitry 80 may switch which band A receive signal or which band B receive signal is used for the main and secondary receive signals, depending on the signal characteristics of each one of the receive signals. Accordingly, the antenna 74 with the most favorable reception characteristics for the band A signal and/or the band B signal may be used as the main receive signal for band A and band B.

Due to the fact that band A transmit signals and band B transmit signals are separated from band B receive signals and band A receive signals, respectively, by separate antenna feeds, isolation between the different bands in the front end circuitry 78 is very high. Further, using antenna-to-antenna isolation in the front end circuitry 78 allows for a reduction in filtering circuitry, thereby reducing insertion loss in the front end circuitry 78 when compared to conventional carrier aggregation solutions. Accordingly, the performance of a mobile terminal in which the front end circuitry 78 is integrated may be improved.

In one embodiment, the antenna tuning circuitry 76 coupled between each one of the diplexers 90 and each one of the antennas 74 is configured to optimize each one of the antennas 74 for transmitting and/or receiving signals about a certain operating band or operating bands. For example, the first antenna tuning circuitry 76A may optimize the first antenna 74A for transmitting and receiving signals about band A and band B, the second antenna tuning circuitry 76B may optimize the second antenna 74B for transmitting and receiving signals about band B only, and the third antenna tuning circuitry 76C may optimize the third antenna 74C for transmitting and receiving signals about band A only. As will be appreciated by those of ordinary skill in the art, optimizing each one of the antennas 74 for a relatively narrow band improves the performance of the antennas 74, for example, by reducing the VSWR and insertion loss thereof.

In one embodiment, the second antenna 74B and the third antenna 74C are combined into a dual-feed antenna, the details of which will be appreciated by those of ordinary skill in the art. In this embodiment, a first feed of the antenna 74 may be coupled to antenna tuning circuitry 76 to optimize the first feed for the transmission and reception of band A signals, and a second feed of the antenna 74 may be coupled to antenna tuning circuitry 76 to optimize the second feed for transmission and reception of band B signals. Band A transmit and receive signals and band B transmit and receive signals may be appropriately routed to the first feed and the second feed by the front end switching circuitry 92.

In general, any number of duplexers may be used with a corresponding number of diplexers to allow the front end circuitry 78 to support any number of different carrier aggregation operations. Alternatively, the first duplexer 114A and the second duplexer 114B may be switchable duplexers, such that they can be switched to filter signals about different operating bands, and direct these signals to an appropriate transceiver module in the transceiver circuitry 96. Further, the first diplexer 116 may be a tunable or switchable diplexer, which has a filter response that can be changed to support several different operating bands, and support circuitry for directing the isolated signals to an appropriate receiver module in the transceiver circuitry 96. In short, as will be appreciated by those of ordinary skill in the art, the principles of the present disclosure may be extended to any number of different operating bands in any combination.

As discussed above, the foregoing functionality allows the front end circuitry 78 to operate in a variety of carrier aggregation configurations. For example, the front end circuitry 78 may operate in a low-band/low-band carrier aggregation configuration, in which band A and band B are different low-band operating bands within the low-band frequency range of about 600 MHz to 1 GHz. The front end circuitry may also operate in a mid-band/mid-band carrier aggregation configuration, in which band A and band B are different mid-band operating bands within the mid-band frequency range of about 1.7 GHz to 2.2 GHz. Alternatively, the front end circuitry 78 may operate in a high-band/high-band carrier aggregation configuration, in which band A and band B are different high-band operating bands within the high-band frequency range of about 2.3 GHz to 2.5 GHz. The antenna switching circuitry 120 may be connected to different low-band selection circuitry 124 and/or mid/high-band selection circuitry 126 in the band selection circuitry 118 to enable the different carrier aggregation configurations described herein.

As a specific example, the front end circuitry 78 may operate in a band 3/band 7 carrier aggregation configuration, in which band A is band 3, with a transmit frequency range of about 1710 MHz to 1785 MHz and a receive frequency range of about 1805 MHz to 1880 MHz and band B is band 7, with a transmit frequency range of about 2500 MHz to 2570 MHz, and a receive frequency range of about 2620 MHz to 2690 MHz.

In a non-carrier aggregation mode of operation of the front end circuitry 78, the switching control circuitry 122 may operate the band selection circuitry 118 and the antenna swapping circuitry 120 to place one of the first duplexer 114A and the second duplexer 114B in contact with one of the antennas 74, while placing the first diplexer 116 in contact with a different one of the antennas 74. For example, the switching control circuitry 122 may operate the band selection circuitry 118 and the antenna swapping circuitry 120 to place the first duplexer 114A in contact with the first antenna 74A and place the first diplexer 116 in contact with the third antenna 74C in order to simultaneously transmit and receive band A signals from the first antenna 74A and receive band A signals from the third antenna 74C. Alternatively, the switching control circuitry 122 may swap the antennas 74, placing the first duplexer 114A in contact with the third antenna 74C and placing the first diplexer 116 in contact with the first antenna 74A in order to simultaneously transmit and receive signals from the third antenna 74C and receive band A signals from the first antenna 74A. Accordingly, the most favorable of the first antenna 74A and the third antenna 74C may be used for transmission of band A signals. In this configuration, the baseband circuitry 80 may use the band A receive signal at the band A receive node RX_A as a main receive signal, and use the band A receive signal at the second band A receive node RX_A1 as a secondary band A receive signal, such as for MIMO and/or diversity applications.

As an additional example, the switching control circuitry 122 may operate the band selection circuitry 118 and the antenna swapping circuitry 120 to place the second duplexer 114B in contact with the first antenna 74A and place the first diplexer 116 in contact with the second antenna 74B in order to simultaneously transmit and receive band B signals from the first antenna 74A and receive band B signals from the second antenna 74B. Alternatively, the switching control circuitry 122 may swap the antennas 74, placing the second duplexer 114B in contact with the second antenna 74B and placing the first diplexer 116 in contact with the first antenna 74A in order to simultaneously transmit and receive band B signals from the second antenna 74B and receive band B signals from the first antenna 74A. Accordingly, the most favorable of the first antenna 74A and the second antenna 74B may be used for the transmission of band B signals. In this configuration, the baseband circuitry 80 may use the band B receive signal at the band B receive node RX_B as a main receive signal, and use the band B receive signal at the second band B receive node RX_B1 as a secondary band B receive signal, such as for MIMO and/or diversity applications.

Those skilled in the art will recognize improvements and modifications to the embodiments of the present disclosure. All such improvements and modifications are considered within the scope of the concepts disclosed herein and the claims that follow.

What is claimed is:

1. Front end circuitry comprising:
    at least three antenna nodes;
    a first duplexer;
    a second duplexer;
    a first diplexer;
    transceiver circuitry coupled to the first duplexer, the second duplexer, and the first diplexer; and
    front end switching circuitry coupled between the at least three antenna nodes, the first duplexer, the second duplexer, and the first diplexer and configured to selectively couple the first duplexer to a first one of the at least three antenna nodes, selectively couple the second duplexer to a second one of the at least three antenna nodes, and selectively couple the first diplexer to a third one of the at least three antenna nodes.

2. The front end circuitry of claim 1 wherein:
    the first duplexer is configured to isolate signals about a first operating band, delivering transmit signals about the first operating band from the transceiver circuitry to the front end switching circuitry and delivering receive signals about the first operating band from the front end switching circuitry to the transceiver circuitry, while attenuating other signals; and the second duplexer is configured to isolate signals about a second operating band, delivering transmit signals about the second operating band from the transceiver circuitry to the front end switching circuitry and delivering receive signals about the second operating band from the front end switching circuitry to the transceiver circuitry, while attenuating other signals.

3. The front end switching circuitry of claim 2 wherein:
the first operating band is one of a group comprising a high band operating band within the frequency range of about 600 MHz to 1 GHz, a mid-band operating band within the frequency range of about 1.7 GHz to 2.2 GHz, and a high-band operating band within the frequency range of about 2.3 GHz to 2.5 GHz; and the second operating band is one of a group comprising a high band operating band within the frequency range of about 600 MHz to 1 GHz, a mid-band operating band within the frequency range of about 1.7 GHz to 2.2 GHz, and a high-band operating band within the frequency range of about 2.3 GHz to 2.5 GHz.

4. The front end switching circuitry of claim 2 wherein the first diplexer is configured to separate receive signals about the first operating band from receive signals about the second operating band, separately delivering the receive signals from the front end switching circuitry to the transceiver circuitry, while attenuating other signals.

5. The front end switching circuitry of claim 4 wherein:
the first operating band is one of a group comprising a high band operating band within the frequency range of about 600 MHz to 1 GHz, a mid-band operating band within the frequency range of about 1.7 GHz to 2.2 GHz, and a high-band operating band within the frequency range of about 2.3 GHz to 2.5 GHz; and the second operating band is one of a group comprising a high band operating band within the frequency range of about 600 MHz to 1 GHz, a mid-band operating band within the frequency range of about 1.7 GHz to 2.2 GHz, and a high-band operating band within the frequency range of about 2.3 GHz to 2.5 GHz.

6. The front end circuitry of claim 2 wherein the transceiver circuitry comprises:
a first power amplifier coupled to the first duplexer; and
a first low-noise amplifier coupled to the first duplexer.

7. The front end circuitry of claim 6 wherein:
the first power amplifier is configured to receive and amplify modulated baseband transmit signals about the first operating band and deliver the amplified transmit signals to the front end switching circuitry through the first duplexer; and
the first low-noise amplifier is configured to receive and amplify receive signals about the first operating band from the first duplexer.

8. The front end circuitry of claim 7 wherein the transceiver circuitry further comprises:
a second power amplifier coupled to the second duplexer; and
a second low-noise amplifier coupled to the second duplexer.

9. The front end circuitry of claim 8 wherein:
the second power amplifier is configured to receive and amplify modulated baseband transmit signals about the second operating band and deliver the amplified transmit signals to the front end switching circuitry through the second duplexer; and
the second low-noise amplifier is configured to receive and amplify receive signals about the second operating band from the second duplexer.

10. The front end circuitry of claim 9 wherein the transceiver circuitry further comprises:
a third low-noise amplifier coupled to the first diplexer; and
a fourth low-noise amplifier coupled to the first diplexer.

11. The front end circuitry of claim 10 wherein:
the third low-noise amplifier is configured to receive and amplify receive signals about the first operating band from the first diplexer; and
the fourth low-noise amplifier is configured to receive and amplify receive signals about the second operating band from the first diplexer.

12. The front end circuitry of claim 1 further comprising:
a first antenna coupled to a first one of the at least three antenna nodes;
a second antenna coupled to a second one of the at least three antenna nodes; and
a third antenna coupled to a third one of the at least three antenna nodes.

13. The front end circuitry of claim 1 further comprising:
a first antenna coupled to a first one of the at least three antenna nodes; and
a dual-feed antenna coupled to a second and third one of the at least three antenna nodes.

14. A mobile terminal comprising:
baseband circuitry;
at least three antennas; and
front end circuitry coupled between the baseband circuitry and the at least three antennas, the front end circuitry comprising:
a first duplexer;
a second duplexer;
a first diplexer;
transceiver circuitry coupled between the first duplexer, the second duplexer, the first diplexer, and the baseband circuitry; and
front end switching circuitry coupled between the at least three antennas, the first duplexer, the second duplexer, and the first diplexer and configured to selectively couple the first duplexer to a first one of the at least three antennas, selectively couple the second duplexer to a second one of the at least three antennas, and selectively couple the first diplexer to a third one of the at least three antennas.

15. The mobile terminal of claim 14 wherein:
the first duplexer is configured to isolate signals about a first operating band, delivering transmit signals about the first operating band from the transceiver circuitry to the front end switching circuitry and delivering receive signals about the first operating band from the front end switching circuitry to the transceiver circuitry, while attenuating other signals; and
the second duplexer is configured to isolate signals about a second operating band, delivering transmit signals about the second operating band from the transceiver circuitry to the front end switching circuitry and delivering receive signals about the second operating band from the front end switching circuitry to the transceiver circuitry, while attenuating other signals.

16. The mobile terminal of claim 15 wherein:
the first operating band is one of a group comprising a high band operating band within the frequency range of about 600 MHz to 1 GHz, a mid-band operating band within the frequency range of about 1.7 GHz to 2.2 GHz, and a high-band operating band within the frequency range of about 2.3 GHz to 2.5 GHz; and the second operating band is one of a group comprising a high band operating band within the frequency range of about 600 MHz to 1 GHz, a mid-band operating band within the frequency range of about 1.7 GHz to 2.2 GHz, and a high-band operating band within the frequency range of about 2.3 GHz to 2.5 GHz.

17. The mobile terminal of claim 15 wherein the first diplexer is configured to separate receive signals about the first operating band from receive signals about the second operating band, separately delivering the receive signals from the front end switching circuitry to the transceiver circuitry, while attenuating other signals.

18. The mobile terminal of claim 17 wherein:

the first operating band is one of a group comprising a high band operating band within the frequency range of about 600 MHz to 1 GHz, a mid-band operating band within the frequency range of about 1.7 GHz to 2.2 GHz, and a high-band operating band within the frequency range of about 2.3 GHz to 2.5 GHz; and the second operating band is one of a group comprising a high band operating band within the frequency range of about 600 MHz to 1 GHz, a mid-band operating band within the frequency range of about 1.7 GHz to 2.2 GHz, and a high-band operating band within the frequency range of about 2.3 GHz to 2.5 GHz.

19. The mobile terminal of claim 15 wherein the transceiver circuitry comprises:

a first power amplifier coupled to the first duplexer; and
a first low-noise amplifier coupled to the first duplexer.

20. The mobile terminal of claim 19 wherein:

the first power amplifier is configured to receive and amplify modulated baseband transmit signals about the first operating band from the baseband circuitry and deliver the amplified transmit signals to the front end switching circuitry through the first duplexer; and the first low-noise amplifier is configured to receive and amplify receive signals about the first operating band from the front end switching circuitry and deliver the amplified receive signals to the baseband circuitry for further processing.

21. The mobile terminal of claim 20 wherein the transceiver circuitry comprises:

a second power amplifier coupled to the second duplexer; and
a second low-noise amplifier coupled to the second duplexer.

22. The mobile terminal of claim 21 wherein:

the second power amplifier is configured to receive and amplify modulated baseband transmit signals about the second operating band from the baseband circuitry and deliver the amplified transmit signals to the front end switching circuitry through the second duplexer; and the second low-noise amplifier is configured to receive and amplify receive signals about the second operating band from the second duplexer and deliver the amplified receive signals to the baseband circuitry for further processing.

23. The mobile terminal of claim 22 wherein the transceiver circuitry further comprises:

a third low-noise amplifier coupled to the first diplexer; and
a fourth low-noise amplifier coupled to the first diplexer.

24. The mobile terminal of claim 23 wherein:

the third low-noise amplifier is configured to receive and amplify receive signals about the first operating band from the first diplexer and deliver the amplified receive signals to the baseband circuitry for further processing; and the fourth low-noise amplifier is configured to receive and amplify receive signals about the second operating band from the first diplexer and deliver the amplified receive signals to the baseband circuitry for further processing.

* * * * *

UNITED STATES PATENT AND TRADEMARK OFFICE
CERTIFICATE OF CORRECTION

PATENT NO. : 9,270,302 B2  
APPLICATION NO. : 14/302500  
DATED : February 23, 2016  
INVENTOR(S) : Nadim Khlat Page 1 of 1

It is certified that error appears in the above-identified patent and that said Letters Patent is hereby corrected as shown below:

In the Specification

In Column 2, Line 40, replace "RX_ A" with --RX_A--.

In Column 10, Line 38, replace "RX_ B1" with --RX_B1--.

Signed and Sealed this  
Seventh Day of August, 2018

Andrei Iancu  
*Director of the United States Patent and Trademark Office*